Oct. 22, 1935.   A. MOORHOUSE   2,017,915
CLUTCH MECHANISM
Filed July 20, 1932
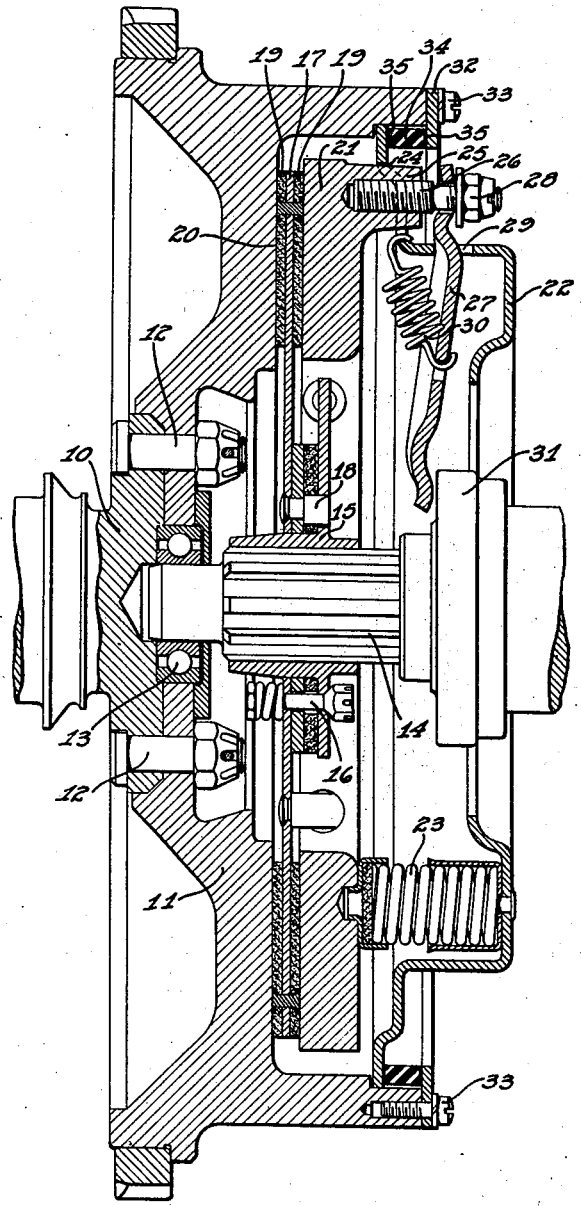
Fig. I
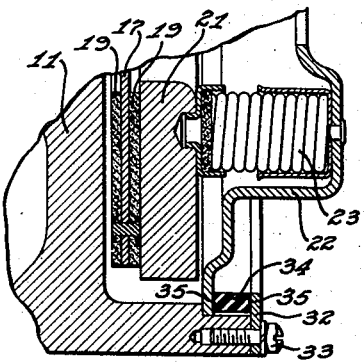
Fig. 2
Inventor
ALFRED MOORHOUSE.
By Milton Tibbetts
Attorney Patented Oct. 22, 1935

2,017,915

UNITED STATES PATENT OFFICE 2,017,915

CLUTCH MECHANISM

Alfred Moorhouse, Detroit, Mich., assignor to Packard Motor Car Company, Detroit, Mich., a corporation of Michigan Application July 20, 1932, Serial No. 623,505

13 Claims. (Cl. 192—55)

This invention relates to power transmission mechanism and more particularly to clutch mechanism.

The conventional type of automobile clutch now in general use includes a primary driving element, usually the flywheel, a second driving element, usually consisting of one or more plates, a driven member with friction facings between the driving elements, and means connecting the driving members so that they will move circumferentially as a unit. In the connecting means, a cover plate is usually fixed to the flywheel and serves as a bearing or anchor for coil springs which normally press the second driving element toward the primary driving element to clamp the driven member therebetween, and spring pressed fingers are pivotally mounted on the cover member to release the spring pressed second driving element through suitable connecting means when actuated by a slidable control sleeve. With such construction, the total spring pressure is resisted by the cover plate or anchored part of the connecting means and the pressure of the throwout fingers is likewise resisted when the clutch is in released position. As the driving elements are connected so that they will not rotate circumferentially relatively, forces are transmitted from the second driving element directly to the primary driving element and, as a result, the zone of engagement of the clutch is limited and, unless the operator is careful in slipping the clutch into engagement, there will be a grabbing action which causes vibrations, better known as clutch chatter.

An object of this invention is to provide a new and novel clutch structure having a smooth and noiseless engaging action without requiring skilled operation.

Another object of the invention is to provide a clutch structure with a resilient connection so that there can be a limited circumferential movement between the driving elements when engaging the driven element to lengthen the engaging zone.

A further object of the invention is to provide vibration damping means between the driving parts of a clutch between which a driven element is clamped.

A still further object of the invention is to provide a clutch construction in which torque reaction is cushioned.

Other objects of the invention will appear from the following description taken in connection with the drawing, which forms a part of this specification, and in which:

Fig. 1 is a vertical sectional view through a clutch mechanism with which my invention is incorporated and showing the clutch engaged;

Fig. 2 is a fragmentary sectional view of the same with the clutch disengaged.

Referring now to the drawing by characters of reference, 10 represents a driving means, such as as the end of an engine crank shaft, to which a primary driving member such as a flywheel 11 is fixed by suitable fastening means, as indicated at 12. The central portion of the flywheel is formed with an opening in which is carried a roller bearing 13 for supporting the forward end of a transmission drive shaft 14.

A driven member is arranged adjacent the rear face 20 of the flywheel and includes a hub 15 splined on the forward end of the transmission drive shaft and secured thereto by spring mounted bolts 16 is a plate or disc 17, suitable pilots 18 being fixed to the plate and aligning with openings formed in the hub. Fixed on each side of the clutch plate are friction facings 19, the forward one of which is adapted to engage the face 20 and the rear one of which engages with a second driving member in the form of a pressure ring 21. When such driving member is moved forward sufficiently to clamp the driven member against the flywheel face, then rotation is transmitted from the flywheel to the transmission shaft. When the second driving member releases the driven member from the face of the flywheel, then of course the transmission shaft is not driven.

It is the usual practice to provide a connecting means between the primary and the second driving members which is of such a character that they rotate together, but it is one of the main purposes of this invention to provide a resilient connecting means so that there can be a limited circumferential movement between the two driving members. This connecting means includes the usual connecting mechanism extending between the second driving member and the primary driving member such as an anchor member or support, in this instance, in the form of a cover plate 22 which serves as a bearing for coil springs, as indicated at 23, normally exerting sufficient pressure against the second driving member to hold the driven member in clamped or driving relation with the flywheel. The cover plate is formed with a plurality of openings, as indicated at 24, through which bosses on the pressure ring, as indicated at 25, project and, through this arrangement, the cover member and the second driving member will be held against relative circumferential movement. Suitable studs, as indicated at 26, are anchored in the bosses and project through radially extending release or throw-out fingers 27 and nuts, as indicated at 28, are screwed on the studs to prevent axial displacement of the fingers. The fingers project through openings 29 in the cover plate and are held against the walls forming the forward portions of the openings by coil springs 30 so that, due to the springs and anchorage on the studs 26, the release fingers normally are held in desired relation with respect to the cover plate and, together with the cover plate and the studs, form a part of the connecting means between the driving members. The rear end of the flywheel forms a guide for the periphery of the rear cover and a securing ring 32 is fixed to the end of the flywheel by suitable bolts 33. This securing ring preferably overlies the peripheral portion of the cover plate and is in a spaced relation therewith. Between the ring forming a part of the primary driving member and the cover plate, I provide a resilient or yieldable means, in this instance illustrated as a circular rubber ring 34, which forms a part of the connecting means between the driving members. I prefer that this ring be bonded, as indicated at 35, to the securing ring and to the plate. It will be seen that the resilient means forms a part of the connection between the two driving members so that the support or cover plate and ring 32 can move relatively a limited extent in the direction of the axis of the flywheel and can also rotate relatively a limited extent in a direction normal to the axis of the flywheel.

Slidable on the transmission driving shaft and engageable with the inner ends of the release fingers is a shifter sleeve 31 with which suitable conventional control mechanism (not shown), anchored to the motor vehicle frame, is associated.

As shown in Fig. 1, the clutch is in engagement and under which circumstance the release sleeve 31 has been moved to its rear position. In order to move the clutch into released position, as shown in Fig. 2, the control sleeve 31 is moved forwardly so that it engages the inner ends of the release fingers 27 to move them therewith and thus rock them on the cover plate so that the outer ends are moved rearwardly against the nuts 28 on the studs 26 thereby moving the second driving member rearwardly.

When the shifter sleeve is disengaged from the throw-out fingers 27, the forces exerted by the springs 23 act to move the pressure ring to the left engaging the clutch plates with the flywheel face 20, and they also act to move the cover 22 toward the right thus compressing the rubber ring 34. When force is applied against the fingers by the shifter sleeve, they fulcrum on the cover 22 and through engagement with nuts 28 exert a force on the studs 26 moving the pressure ring 21 and the clutch plates away from the flywheel face 20 and thereby disengage the clutch. During this disengaging action the springs 23 still exert pressure on the cover tending to move it toward the right but such force on the plates is more than overcome by the force exerted against the fingers 27 and the reaction forces at their fulcrum points so that the cover is actually moved to the left placing the rubber ring in tension, as shown in Fig. 2.

It will be seen that the cover plate is resiliently connected to the flywheel in what may be termed a resilient relation so that it can either move in the direction of or normal to the axis of the flywheel and thus cushion vibration occurring between the two driving elements. As a result, there will be no chatter in the clutch mechanism and, due to the bonding of the rubber, torque reaction of the clutch is transmitted in a manner such that the rotational zone for the clutch engagement is lengthened and resistance to relative rotation of the two driving members away from inactive position is gradually increased as compared with a structure in which the two driving elements are fixed to rotate as a unit, and thus I provide a smoother clutch engaging action.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a clutch mechanism, the combination of a driving member, a cover in axially aligned relation with the driving member, and a rubber mass between the cover and the driving member, said mass being bonded to both the cover and the driving member, said mass being in tension when the clutch is disengaged and in compression when the clutch is engaged.

2. In a clutch mechanism, a flywheel, a securing ring fixed to the flywheel, a cover having its periphery within the flywheel and spaced from the ring, and resilient means interposed between and fixed to the cover and the securing ring, said resilient means being in tension when the clutch is disengaged.

3. In a clutch mechanism, the combination of a driving member, a cover, and an elastic means forming the sole connection between the driving member and the cover, said elastic means being in tension when the clutch is disengaged and being in compression when the clutch is engaged.

4. In a clutch mechanism, a flywheel, a securing ring detachably secured to the flywheel and axially removable therefrom, a cover having its peripheral portion spaced interiorly of the flywheel from the securing ring, and a rubber mass between the ring and the peripheral portion of the cover, said rubber mass being bonded to the cover and to the ring.

5. In a clutch mechanism, a primary driving member, a second driving member, a driven member intermediate the driving members having frictional facings, said second driving member being axially movable to clamp or release the driven member relative to the primary driving member, a bearing member, springs between the bearing member and the second driving member, a resilient connection joining the bearing member and the primary driving element, and a connection between the bearing member and the second driving member fixing them against relative rotation.

6. In a clutch mechanism, the combination of a driven member, two driving members adapted to frictionally clamp the driven member therebetween, and rubber connecting means joining the driving members together, said means being in compression and allowing a limited relative rotation of said driving members of gradually decreasing speed when clamping the driven member, and being in tension when the driven member is disengaged.

7. In a clutch mechanism, the combination of a driving member, a cover in aligned relation with the driving member, and rubber means connecting the cover and the driving member, said rubber means being entirely in tension when the clutch is disengaged.

8. In a clutch mechanism, the combination of two driving members adapted to clamp a driven member therebetween, and a rubber connecting means joining the driving members together, said rubber means being in compression when the driving members are clamped to the driven member and being in tension when the driving members are disengaged from the driven member.

9. In a clutch mechanism, a pirmary driving member, a second driving member, a driven member intermediate the driving members having frictional facings, said second driving member being movable axially to clamp the driven member with the driving member, and a rubber connecting means joining the driving members together, said rubber connecting means being in compression when the driving members are in engagement with the driven member and being in tension when the driving members are disengaged from the driven member.

10. A clutch mechanism comprising a driving member, a driven member, a pressure ring for engaging and disengaging the driven member with respect to the driving member, a cover, spring means between the cover and the pressure ring normally urging the ring into position engaging the driven member with the driving member, throw-out levers carried by the cover and connected to the pressure ring, and means connecting the cover with the driving member, said means being in compression when reacting to the pressure of the spring means during clutch engagement and being in tension when reacting to the force exerted by the throw-out levers during clutch disengagement.

11. A clutch mechanism comprising a driving member, a driven member, a pressure ring for engaging and disengaging the driven member relative to the driving member, a cover, spring means between the cover and the pressure ring normally urging the ring into a position engaging the driven member with the driving member, throw-out levers connected to the pressure ring, and rubber means bonded to the cover and the driving member, said rubber means being in compression when reacting to spring pressure force during clutch engagement and being in tension when reacting to force applied by the throw-out levers during disengagement of the clutch.

12. In a clutch mechanism, the combination of a driving member, a cover, and resilient means forming the sole connection between the cover and the driving member, said resilient means being in tension when the clutch is disengaged and being in compression when the clutch is engaged.

13. In a clutch mechanism, a recessed driving member, a ring secured to the driving member and extending into the zone of the recess in a direction normal to the axis of the member, a cover for the recess having a peripheral portion extending through the ring into the recess in said driving member, the peripheral portion of said cover being parallel to and spaced from the ring, and a rubber mass fixed between the ring member and the peripheral portion of the cover.

ALFRED MOORHOUSE.